United States Patent [19]
Beye

[11] Patent Number: 5,433,614
[45] Date of Patent: Jul. 18, 1995

[54] METHOD OF INSTRUCTING/TUTORING USING FULL MOTION TUTOR/INSTRUCTOR PERSONAGE IN WINDOW SUPERIMPOSED ON EDUCATIONAL MATERIAL

[76] Inventor: Rick A. Beye, 4-30 Lyncrest Ave., Fairlawn, N.J. 07410

[21] Appl. No.: 118,712

[22] Filed: Oct. 13, 1993

[51] Int. Cl.$^6$ .............................................. G09B 5/02
[52] U.S. Cl. ................................................. 434/307 R
[58] Field of Search ................ 434/307, 308, 309, 310

[56] References Cited

U.S. PATENT DOCUMENTS

| | | | |
|---|---|---|---|
| 4,797,750 | 1/1989 | Karwait | 434/307 X |
| 4,804,328 | 2/1989 | Barrabee | 434/308 |
| 4,884,972 | 12/1989 | Gasper | 434/185 |

FOREIGN PATENT DOCUMENTS 0284192 11/1990 Japan .................................... 434/308

Primary Examiner—Gene Mancene
Assistant Examiner—Jeffrey A. Smith

[57] ABSTRACT

The Personal Video Tutor invention is a new educational presentation procedure which promotes the mechanization of the educational process through the use of video display devices. It involves the simultaneous and constant display of the instructor/tutor's visage, superimposed in a readily discernable way, over and along with the display of the educational material which is to be assimilated or learned by the student. The instructor/tutor's "live" image is captured and positioned so as to create the sensation that the student is being individually tutored in a non-threatening, conversational manner. The image may be scalably enlarged or reduced and position anywhere on the display.

6 Claims, 5 Drawing Sheets

METHOD OF INSTRUCTING/TUTORING USING FULL MOTION TUTOR/INSTRUCTOR PERSONAGE IN WINDOW SUPERIMPOSED ON EDUCATIONAL MATERIAL

BACKGROUND OF THE INVENTION

The present invention relates to the mechanization of the educational process using video display devices. The display devices may be free standing cathode ray tubes (CRTs) as in television sets or connected to computers as in computer monitors. The video display devices may also belong to the next generation: liquid crystal displays (LCDs). The educational process involves exposing the interested student to pertinent material in an organized, structured fashion so as to enable the student to assimilate or learn the material. The student is exposed to the material by displaying it on the video device so that the student may see the information while listening to a "tutor" explain it in greater detail. The essence of the invention is the simultaneous display of the tutor's visage along with the material so as to create the sensation that the student is being individually tutored in a non-threatening, conversational manner.

DESCRIPTION OF PRIOR ART

Since their introduction, film and video tape information storage and retrieval mechanisms have been used to present material to students with the intent to educate and inform them. Recently, educational information programs using video have been greatly enhanced through the ability to store them in digitized form on computer disks and tape. Historically, the educational presentation method involves displaying still or moving images with an instructor's voice narrating the educational content.

While this method works well with classroom-based groups of students, it suffers when the student is viewing the material in isolation. The home study student requires the same socialized feedback that is present in group study. But, by definition, this student is isolated from other students and working through the educational material on his or her own. What this student needs is someone to share his or her learning experience. Someone to team with the student and to be a mentor to the student.

SUMMARY OF INVENTION

It is the object of the Personal Video Tutor invention to provide the isolated student with the sensation that there is an individual tutor working with them and encouraging them as they learn the material. The omnipresent visage of a real person sharing the learning space on the display creates this sensation. The student can see who is guiding them through the material, who is responsible for its content and design, and who is particularly interested in their achievement.

Underlying the significance of this invention is the perception that present educational institutions must adapt to a changing world. The employable "half-life" of a college degree grows shorter every year. Society will continue to require constant re-education of its work force in order to remain productive and competitive. This continuing education must coincide with current employment. The time and expense of travel to and from classroom based education is wasted when the same educational service can be delivered to the individual's home. Within this "home based", educational environment the student has a flexible schedule with flexible learning rates. But the student will suffer a psychological impairment when separated from the social dynamics of studying with a group students. Unless this social withdrawal problem can be overcome, the student will suffer motivational lapses lowering their achievement and their rate of achievement.

The invention addresses this "home study" , social isolation problem and attempts to humanize and personalize the inevitable mechanization and individualization of the educational process.

BRIEF DESCRIPTION OF THE DRAWING

The present invention will be more fully understood by reference to the following detailed description thereof when read in conjunction with the attached drawings, see FIGS. 1(A), (B), (C), (D) and (E).

DETAILED DESCRIPTION OF THE DRAWINGS

The display surface depicted as FIG. 1 can be either a television screen, with the images being received from video tape or transmitted over radio waves or cable, or a computer monitor with the images being received from computer storage media, such as magnetic hard disks, magneto-optical disks or laser disks. The images can be view only, as when a video tape and television screen is being used, or interactive, as when a computer program is controlling the flow of the images and the student is enabled to interact with the flow. The educational material may be still images—charts, graphs, photographs, text slides, etc.—or full motion pictures.

Figure 1A:
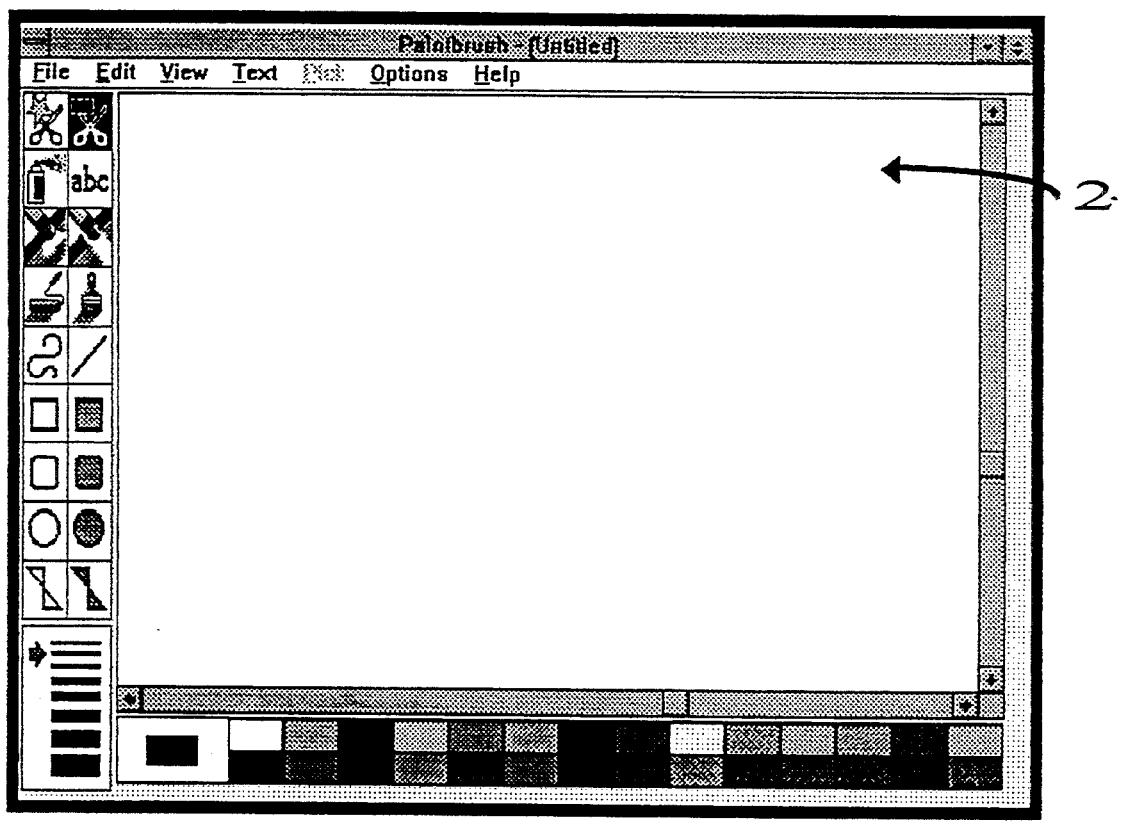
FIGS. 1(A), (B), (C) (D) and (E) are frontal views of the display surface of a video screen.

The display surface is labeled as reference numeral 2, and is depicted exclusively in FIG. 1(A). The educational material targeted for student assimilation is presented in this area. For purposes of illustration, FIG. 1(A) depicts the display of a running computer software program. The subject matter to be assimilated in this illustration is the operations and functions of this particular software application program.

Figure 1B:
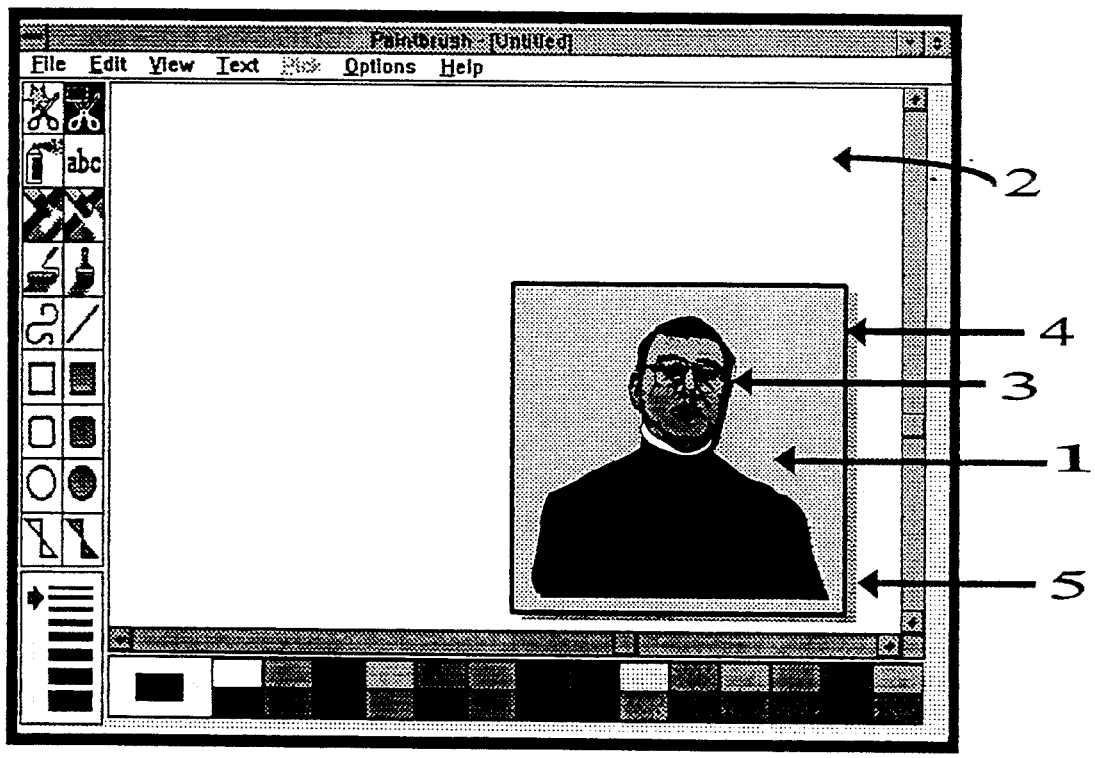
Figure 1C:
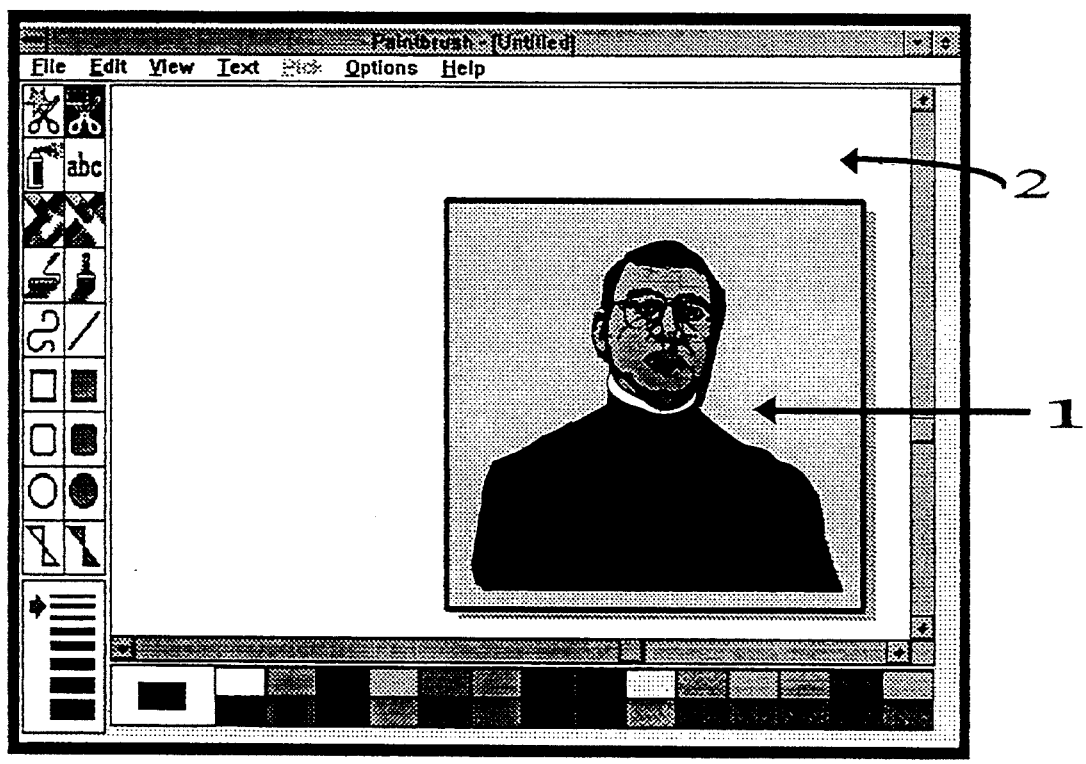
Figure 1D:
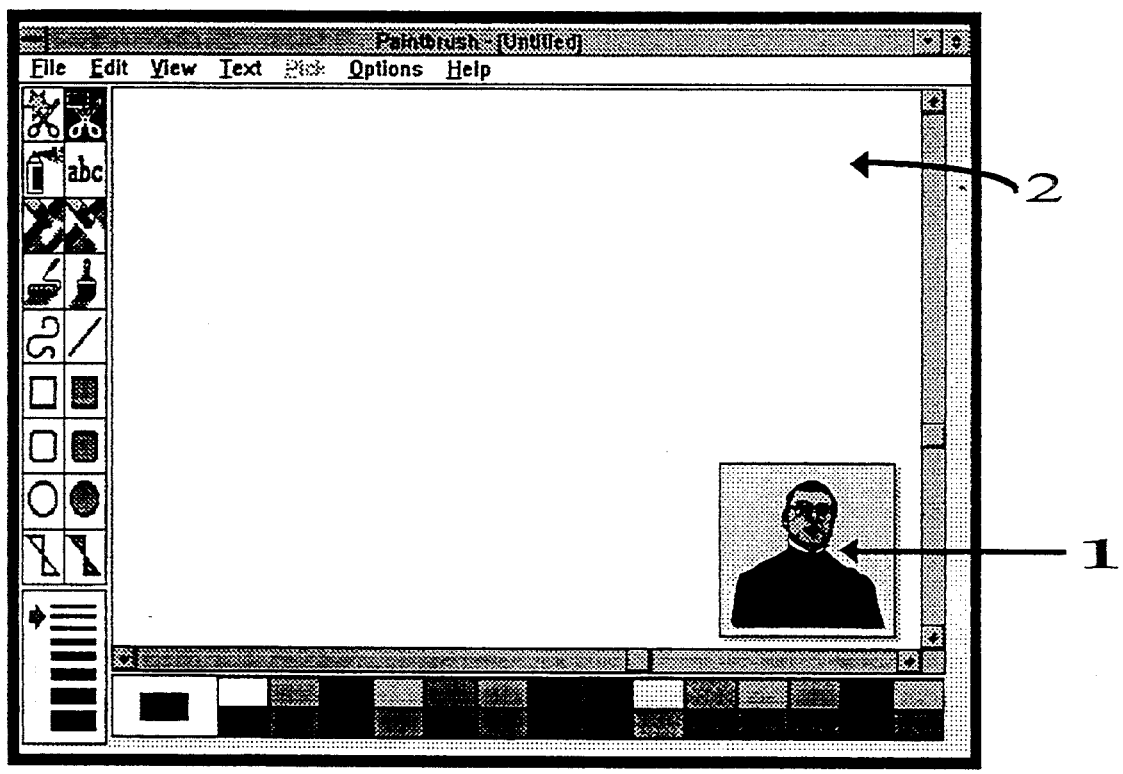
Figure 1E:
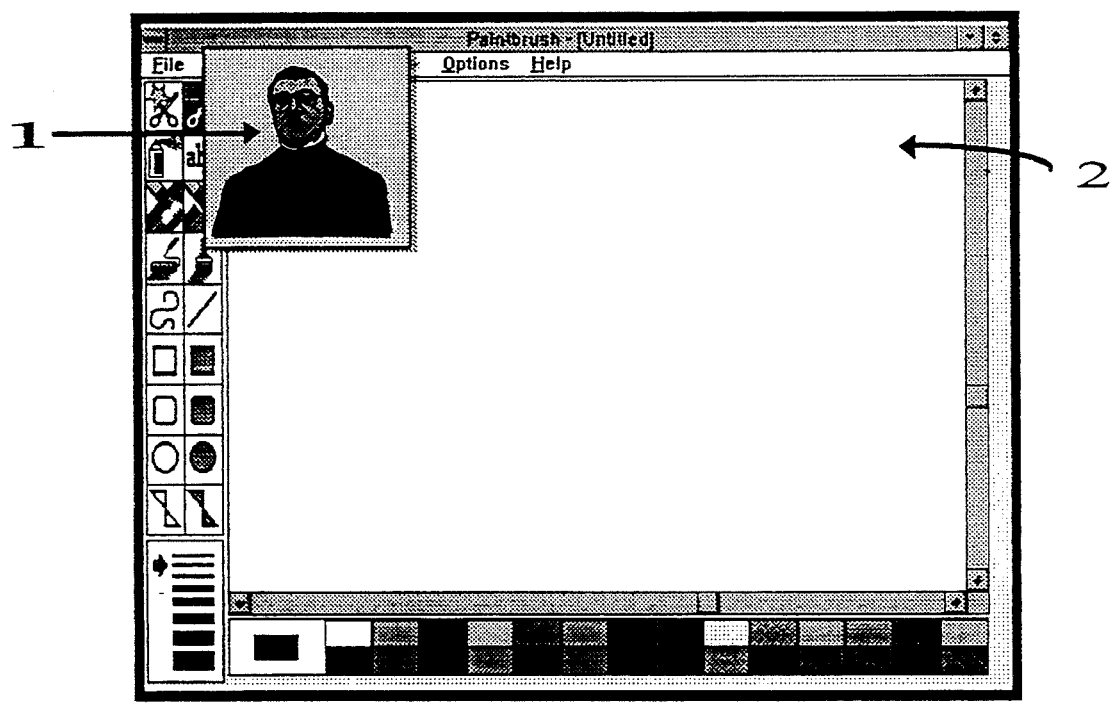

FIGS. 1(B), (C), (D), and (E) add the critical element of this invention: that portion of the display area which contains the image of the instructor/tutor—labeled as reference numeral 1.

The image of the instructor/tutor—reference numeral 1—should be readily identifiable so as to not confuse it with the educational material being presented. This is generally accomplished by incorporating a visible rectangular border framing the instructor/tutor's image, reference numeral 4. The framing effect can be enhanced by adding a "drop shadow" which visually supports the image of the instructor/tutor as floating above the subject matter, reference numeral 5.

Every effort should be made to allow the eyes—reference numeral 3—of the instructor/tutor to be observed. The eyes should appear to address the student viewing the display, except when drawing the student's attention to those areas of the display being specifically referenced. The instructor/tutor's eye movements should give the student the sensation that the instructor/tutor is directly addressing the student, or is sitting beside the student and looking over the student's shoulder when pointing to specific information being displayed.

The instructor/tutor's image is always present. It's size may be changed, enlarged, FIG. 1(C) or reduced, FIG. 1(D). It may be moved, FIG. 1(E) as needed, to anywhere on the display area to draw attention to specific parts of the subject matter displayed or to avoid obscuring those areas of the display containing important material. This movement also reinforces the sensation that the instructor/tutor is floating above the material being presented and is accompanying and guiding the student throught the learning process.

The verbal content presented by the instructor should be more than mere narration. It should be conversational and motivational. When implemented in conjunction with a computer program, it should be interactive, re-acting appropriately from time to time to student responses.

The instructor's voice should be pleasant and clearly audible over whatever sound may accompany the educational material.

Having described my invention in the foregoing description and drawings in such a clear and concise manner that those skilled in the art may readily understand and practice the invention, that which I claim is:

1. A method of instructing/tutoring a student in a particular subject matter of interest using an educational presentation device to facilitate the assimilation and comprehension of said subject matter comprising the steps of:
   a. providing a means for displaying at least one subject matter image upon a video display surface, selected from a group consisting of a television monitor, a computer monitor, and a liquid crystal display;
   b. directing said student to view a presentation receivable from a suitable video source upon said displaying means, said presentation comprising:
      i. displayed educational material conveying said subject matter as an image upon said video display surface,
      ii. a displayed personage of an actual human instructor/tutor as a full motion image upon said video display surface, in a readily observable window which is constantly superimposed on said educational material during the presentation sequence and is purposely positioned so as to focus the student's attention on selected portions of the displayed material, and
      iii. a scripted and directed sequence of instruction presented by the said displayed personage of an actual human instructor/tutor based on said instructor/tutor's expert knowledge of said educational material and the discerned capabilities of the student.

2. The method of instructing/tutoring a student as recited in claim 1, wherein said means for displaying further comprises means for displaying at least one still motion image upon said video display surface.

3. The method of instructing/tutoring a student as recited in claim 1, wherein said means for displaying further comprises means for displaying at least one full motion image upon said video display surface.

4. The method of instructing/tutoring a student as recited in claim 1, wherein said displayed personage of an instructor/tutor is moveable to any location of the video display surface, so as to avoid obscuring or detracting from said displayed educational material, to draw attention to specific portions of the displayed material, and to reinforce the sensation and simulation of live instructing/tutoring.

5. The method of instructing/tutoring a student as recited in claim 1, wherein said readily observable window is scaleably resizeable, such that said window may be enlarged and reduced as desired, so as to avoid obscuring or detracting from said displayed educational material.

6. The method of instructing/tutoring a student as recited in claim 1, wherein said displayed personage of an instructor/tutor is presented such that the eyes of said instructor/tutor create the illusion that the instructor/tutor is paying personal attention to said student by shifting from clear eye contact with said student to specific portions of said educational material being referenced in order to draw the attention of said student to said specific portions.

* * * * *